Figure 3:
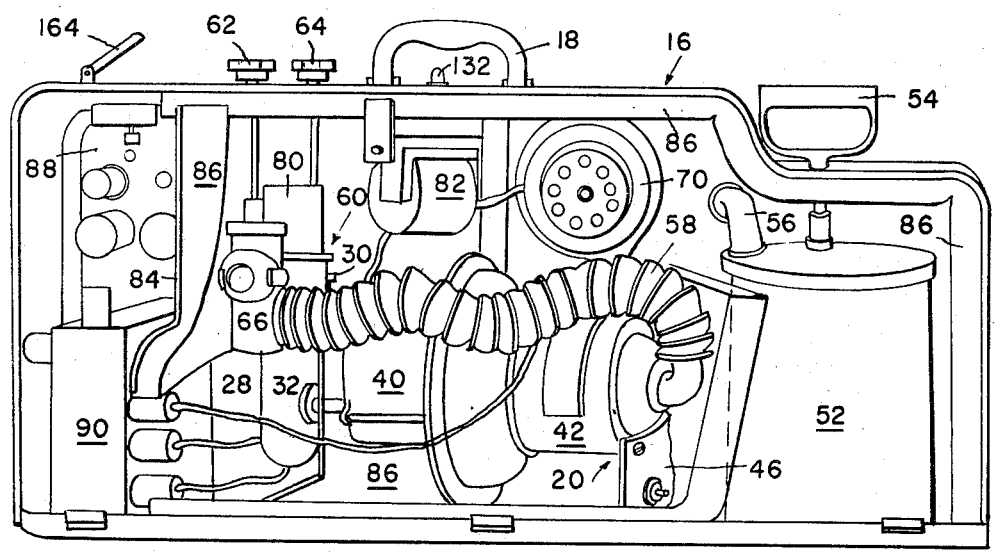

Feb. 5, 1957 M. H. POLZIN ET AL 2,780,222
RESPIRATORS
Filed Dec. 18, 1953 5 Sheets-Sheet 1
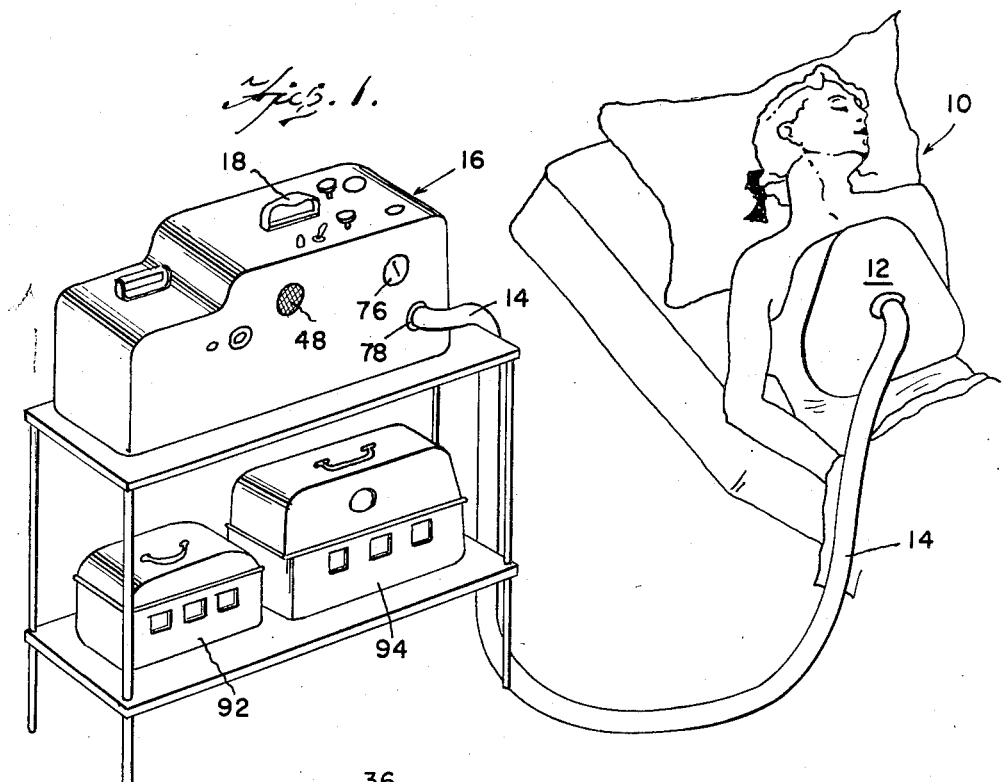
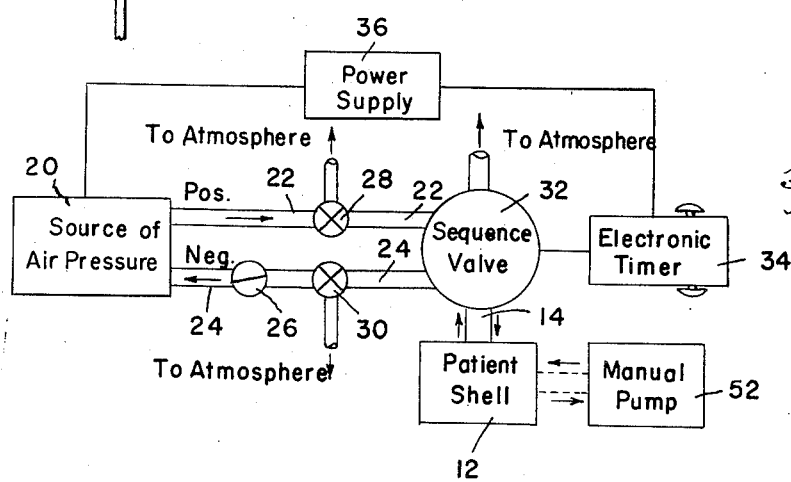
INVENTORS
Marvin H. Polzin
John A. Geer
Fred E. Fowler
BY
Arthur Middleton
ATTORNEY INVENTORS
Marvin H. Polzin
John A. Geer
Fred E. Fowler
BY Arthur Middleton
ATTORNEY INVENTORS
Marvin H. Polzin
John A. Geer
Fred E. Fowler
BY Arthur Middleton
ATTORNEY Feb. 5, 1957
M. H. POLZIN ET AL
2,780,222
RESPIRATORS
Filed Dec. 18, 1953
5 Sheets-Sheet 5
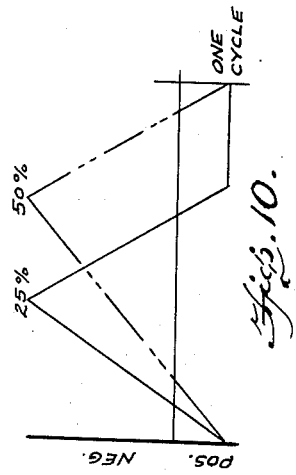
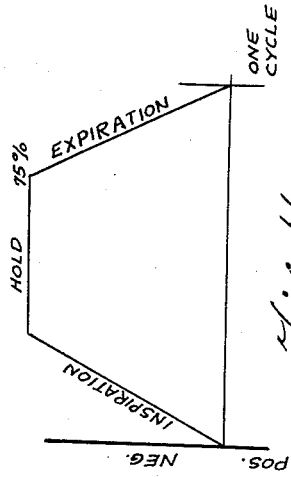
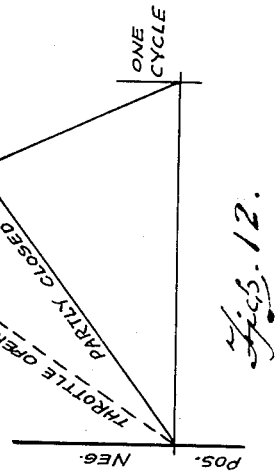
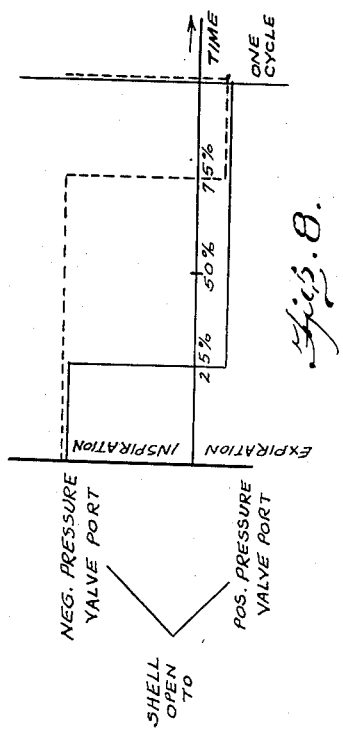
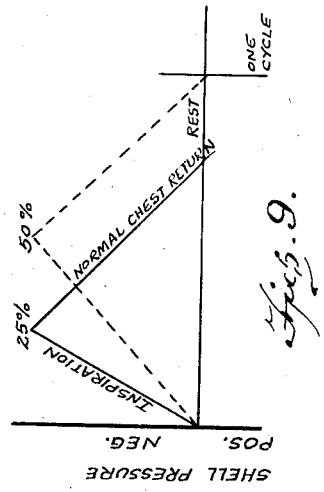
INVENTORS
Marvin H. Polzin
BY John A. Geer
Fred E. Fowler
ATTORNEY

United States Patent Office 2,780,222
Patented Feb. 5, 1957

2,780,222
RESPIRATORS

Marvin H. Polzin, Wheatridge, and John A. Geer and Fred E. Fowler, Boulder, Colo., assignors to J. J. Monaghan Company, Inc., Denver, Colo., a corporation of Colorado Application December 18, 1953, Serial No. 398,986

10 Claims. (Cl. 128—30)

This invention pertains to kinestherapy apparatus, and particularly to apparatus for inducing artificial respiration in human patients.

In the treatment and management of patients afflicted with various paralytic disorders, notably poliomyelitis, it has become common practice to place the patient under the influence of a respirator device for the purpose of subjecting his thorax and abdomen to periodic changes in pneumatic pressure (either positive or negative with respect to atmospheric pressure, or both) in order to induce the regular inhalation and exhalation of air. In this way, life can be sustained in a patient whose paralysis would otherwise render him unable to breathe.

Previous apparatus of this general type has been deficient in two major ways. First, inadequate provision has been made for control not only of the range of rates of pulsation of the induced breathing, but also of the percentage of a complete cycle of breathing occupied by its two phases of inhalation and exhalation. In addition, it is also necessary to control the magnitudes of the applied pressures, either positive or negative or both, to suit the requirements of comfort and maximum therapeutic value. Since these factors may vary from patient to patient, and also from time to time and in accordance with the desired clinical procedures, it is highly desirable to provide apparatus of this type with simple and compact controls adequate to regulate all of the above variables.

It is an object of the present invention to provide artificial respiration apparatus having simple and effective controls of the type just described.

Quite apart from the above object, it is very desirable to provide a respirator which is essentially portable, as compared to the so-called "Iron Lung" whose movements are restricted to hospital conditions and availability of commercial power circuits. In such apparatus, the patient is afforded practically no freedom of movement, which involves great discomfort and the expense of constant attendance, and does not facilitate his gradual return to a normal regimen. Accordingly, it is another important object of the present invention to provide apparatus which may readily be moved from place to place, for example, along with a patient in a vehicle, without continuous dependence upon a nearby commercial power line. The satisfactory accomplishment of this object of the invention involves, in addition to the use of a relatively smaller chamber or shell suitable for applying the desired pressure variations to the thorax and abdomen alone, the provision of a portable or stand-by power supply capable of operating the equipment for a period of at least a few hours. Taken together, these features of portability also enable the patient to have considerable freedom of arm and leg movement, and to occupy lying or sitting positions at will. Particularly in the terminal stages of recovery from a paralytic attack, such freedom is conducive to the early return of the patient to a more normal state of living.

It is therefore a further object of the invention to provide a respirator capable of deriving its entire power supply from a set of storage batteries or the like which may be moved from place to place, while maintaining the patient under treatment.

An ancillary object of the invention is to provide a control system for apparatus of the above type which is also capable of being energized from standard power lines such as lighting circuits, and in which the change-over from one type of power supply to the other can readily be accomplished by the layman or other person having no special mechanical or electrical ability. In accordance with the invention, the change-over is accomplished automatically in that when the device is connected to a commercial power circuit, the internal circuit changes are made automatically to disconnect the battery supply. Conversely, and which may be more important to the patient, this arrangement provides for automatic change-over from power-line supply to battery power supply if, for any reason, the power line supply should fail. Upon such failure, whether due to power failure, fuse or breaker operation, pulling of the plug from its socket or other cause, the relays will immediately convert the device for operation from the battery supply. A signal light is simultaneously energized to warn the patient and his attendants that the unit is now on battery operation and that the regular power line supply system is inoperative.

Still another object of the invention is to provide apparatus of the above type whose control system includes circuits by which the pre-adjusted pressure regulation can be arbitrarily increased for a desired time, in accordance with clinical requirements, and such that the apparatus will return to its pre-adjusted normal pressure limit automatically at the end of the period of increased pressure. This feature is of importance in that it enables the operator to induce periodically a deeper breath by the patient by expanding the thorax.

In as much as the pressure, both positive and negative (just referred to) varies in a controlled way to simulate a normal breathing cycle, the result of the momentary increase referred to is essentially an amplification or increase in the amplitude of the curve representing variation in pressure with time.

Still another object of the invention is to provide apparatus of the above type whose various components are housed in suitable portable cases and in which the components are so dispersed as to minimize the adverse effects of the temperatures generated by parts of the equipment such as motors and the like.

Each patient seems to have individual characteristics both of the number of cycles per minute of inspiration and expiration, and of the ratio in each cycle of inspiration to the expiration. Also, there are some individual characteristics which determine the degree of positive and of negative pressures that are comfortable to the patient, whereas greater or lesser degrees give the patient discomfort. Accordingly, it is an object of this invention to devise ways and means for quickly and very accurately controlling (1) the degree of positive and of negative pressure applied, individually and selectively, (2) the number of complete cycles per minute of inspiration and expiration, and (3) the ratio or percentage of the inspiration phase in each cycle as compared with the expiration phase of that cycle. With more particularity, it is an object of the invention to devise electrical means for realizing such controls, including an electro-mechanical valve means for changing from the positive pressure or expiration phase to the negative pressure or inspiration phase, and back again, while at the same time having in the electrical means an easily operable manual control for determining the number of cycles per minute and the ratio of the durations of the inspiration and the expiration phase.

It is a further object of the invention to provide apparatus of the above type which incorporates independent manually operated source of positive and negative pressure, for emergency operation of the equipment in the event of failure of all sources of power.

To recapitulate by way of summary, the invention provides portable artificial respiration apparatus operable either from power lines or from self-contained batteries, for providing readily adjustable independent controls for the adjustment of those parameters of the induced breathing cycle which affect patient comfort and the clinical effectiveness of the apparatus. These parameters include the selection of positive or negative pressure, or both, the percentage of each cycle devoted to inspiration, holding and expiration, and the rate of recurrence of breathing cycles.

Figure 4:
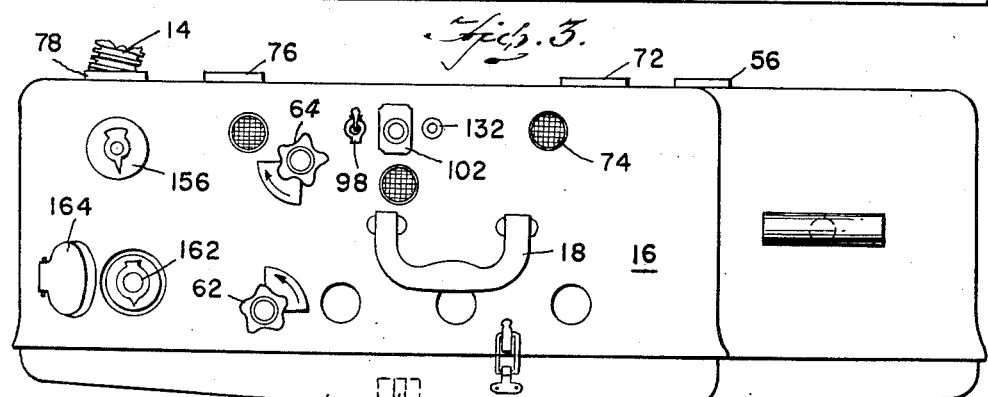
Figure 5:
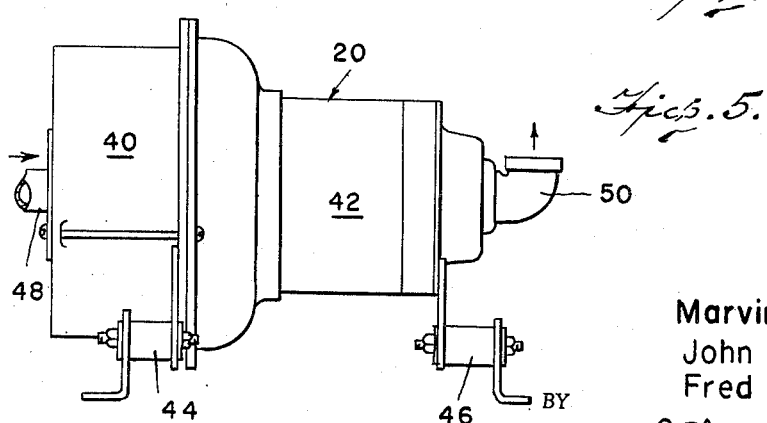
Figure 6:
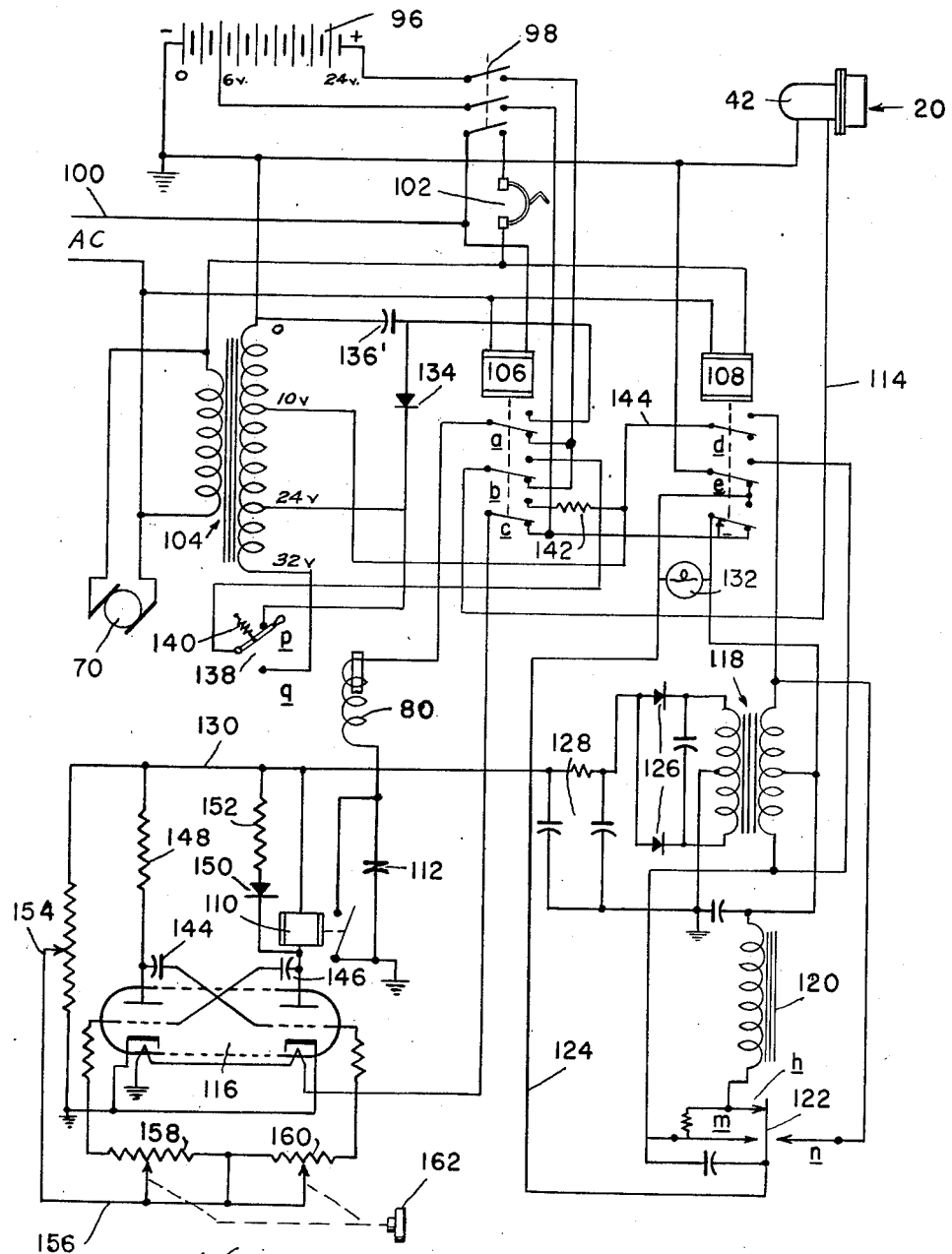

The above and other objects of the invention can best be understood from the following detailed specification of a preferred embodiment thereof, given by way of example, and illustrated in the accompanying drawings, in which:

Fig. 1 is a perspective view of the major components of the invention, shown in use for the artificial respiration of a patient, Fig. 2 is a block diagram of these principal components illustrating their functional relationship, Fig. 3 is a perspective view showing the arrangement of apparatus in the principal portable container, including the controllable pressure source, electronic timing equipment and the like, Fig. 4 is a plan view of the top of the case of Fig. 3 illustrating the nature and arrangement of adjustable controls of the apparatus, Fig. 5 is a view in side elevation of the motor driven pressure source of the equipment, Fig. 6 is a schematic wiring diagram showing the electrical connections controlling the motors and the electronic timer, as well as the arrangements for energizing the control and power circuits from a battery supply.

Figure 7:
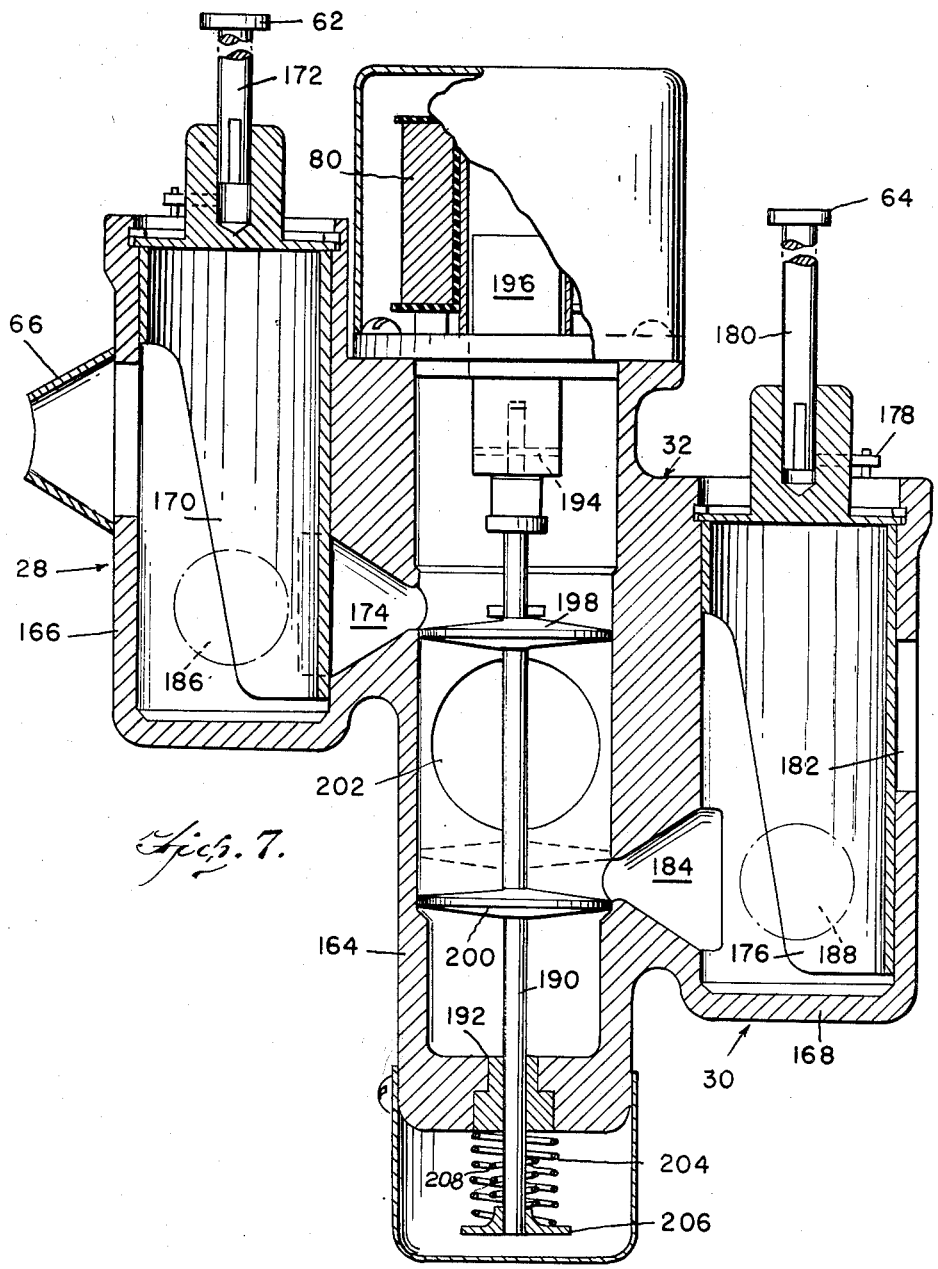

Fig. 7 is a view, principally in vertical section, of the breathing cycle control valve operating automatically under the control of the electronic timer and provided with individual manual adjustments for the degree of positive and negative pressure desired, Fig. 8 is a graphical representation of the variation provided in the percentage of each complete breathing cycle occupied by the inspiration and expiration phases, and also illustrating the control of amplitude of the negative and positive pressures corresponding to those phases, Fig. 9 is a similar graphical representation of a range of rates of increase and decrease in the pressure obtaining in the patient shell, which may be thought of as variations in the "shape" of the pressure curve, Fig. 10 is a view similar to Fig. 9 illustrating a range of pressure curve shapes in a case in which some positive pressure is desired in the shell, Fig. 11 is a similar graph illustrating a curve shape corresponding to the momentary holding of the maximum negative pressure at a fixed value for some part of the breathing cycle, Fig. 12 is a graph similar to Fig. 11 but modified to produce a more gradual rise in the negative pressure with elimination of the constant pressure phase.

Referring now to Fig. 1 of the drawings, numeral 10 designates a patient being treated by the apparatus of the invention, the patient having secured to her thorax and abdomen, as by straps or the like (not shown) a shell 12 whose margin is formed of soft flexible material to provide a substantial seal against the body. Connected to the interior of the shell, and therefore in pressure-exchange relation with the thorax, is a duct or flexible tube 14 leading to the major unit 16 of the respiration equipment, shown as housed within a suitable case of metal or the like and provided with a carrying handle 18. The shell 12 is selected from a set of different shapes and sizes from which a suitable shell for a given patient size can readily be obtained.

The manner in which this difficulty is overcome in the present embodiment is illustrated in the block diagram of Fig. 2 in which the pressure source is designated by numeral 20 having positive pressure outlet 22 and negative pressure outlet (ordinarily referred to as the inlet) 24. In order to aid in establishing the desired positive and negative pressures, a flow control valve 26 may be incorporated in the negative pressure line. In any event, conduits 22 and 24 lead through independent bleeder valves 28 and 30 to a sequence valve 32, whose function is to supply the conduit 14 to shell 12 with positive and negative pressures in sequence at a predetermined repetition rate. Each of valves 28 and 30 has a port in communication with the atmosphere, so that during the positive phase of the cycle the valve 28 will control the positive pressure supplied to the sequence valve 32 and conduit 14; during the negative portion of each cycle, the negative pressure magnitude will be controlled by the setting of valve 30, so that the negative pressure valve can be manually adjusted independent of the positive pressure valve and the controls left at their adjusted positions until a change in either valve is desired. The operation of valves 28, 30 and 32 will be explained in more detail hereinafter.

The sequence valve 32 is operated by a solenoid magnet in a manner to be described below, the frequency of operation of the valve being controlled by the electronic timer 34. A common power supply 36 is indicated for the pressure source 20 and the timer 34. Numeral 52 in Fig. 2 indicates a manual pressure pump which is provided in the event that all power supply should fail, in which case pump 52 is connected direct to the patient shell 12 by the available duct 14.

The major unit 16 of the respirator apparatus contains, in addition to a pneumatic pressure and partial vacuum source, such as a turbine, blower or the like, the necessary electrical and mechanical controls for producing in duct 14 and shell 12 the desired variations in pressure, either above atmospheric (positive) to induce exhalation by the patient, or below atmospheric (negative) to induce inhalation. Fig. 3 of the drawings illustrates the case of major unit 16 in open condition, and the pressure source 20 is represented as a conventional multi-stage air blower 40 direct-connected to an electric motor 42, the assembly being carried upon resilient anti-vibration mounts such as 44 and 46 better shown in Fig. 5. The latter figure also indicates by arrows the direction of air flow through the blower, from inlet (negative pressure side) 48 to outlet (positive pressure side) 50.

For emergency use, or in the event of complete power failure, an auxiliary manually operated pressure source 52 is provided, the same comprising a manual pressure pump operated from outside the casing by a handle 54. The outlet connection from this pump is indicated in Figs. 3 and 4 at 56, into which the shell conduit 14 may be plugged in such circumstances. The rate of respiration is of course controlled manually in this arrangement.

The positive pressure air from source 20 is conveyed by a conduit 58 to one side of a combined bleeder valve and sequence valve structure generally designated by numeral 60 in Fig. 3 and combining elements 28, 30 and 32 of Fig. 2. The negative pressure is in communication with the other side of the same composite valve structure over another conduit or connection not visible in Fig. 3. Both sides of the composite valve structure are in manually controlled communication with the atmosphere to accomplish the controlled air bleeding function described above, and individual controls 62 and 64 are shown for these bleeder valves. Also, Fig. 3 illustrates at 66 an outlet (by-pass) air silencer for the positive pressure valve, comprising a cone-shaped element having an outlet aperture which, when the unit case has its cover 68 in closed position, directs the outlet air through an aperture in said cover. It will be understood that the air passing through the pressure source or blower 40 serves also to cool the motor 42 by flowing therethrough, so that it is desirable, to eliminate excessive heat within the casing, to guide the excess air not passing through the duct 14 outside the casing by the most direct route. In addition, for adequate ventilation of the case interior, an auxiliary cooling fan 70 is provided having an air inlet 72, to draw air through the casing from which it is discharged through numerous air outlets distributed about the casing, as at 74 in Fig. 4.

The throttle valve 26 of Fig. 2 is not shown in Fig. 7, it being understood that it may be disposed anywhere in the negative pressure line between the source and the negative bleeder valve. Numeral 76 indicates a pressure gauge, visible at the front side of the unit casing, connected to a suitable point in the outlet line to patient shell duct 14. The outlet connection for duct 14 and the patient shell is indicated at 78 in Figs. 1 and 4.

The motor 42 of pressure source 20 is preferably arranged for operation on 24 volts alternating or direct current, and the solenoid (80 in Fig. 3) of the sequence valve 32 conveniently will operate from 24 volts direct current. To provide the necessary voltages for these components when operating from a nominal 115 volt 60 cycle power line, a transformer 82 is provided, connected in a manner described below. Thus, referring to Fig. 3, the major heat-generating components of the unit are disposed to the right of a partial partition 84, and the walls of this partial space are lined with a thermal insulating material such as glass wool or the like, indicated by reference numeral 86. This segregation of heat generating parts permits the relatively more delicate electronic components, mounted upon a chassis 88, to be insulated from the heat produced by the motors and transformer. Numeral 90 designates a junction box from which connections are made to the battery supply cases 92 and 94 of Fig. 1. The junction box, into which the various components are connected by plug and socket connectors, greatly facilitates the speedy replacement of any defective major unit of the equipment.

The arrangement of storage batteries in cases 92 and 94 may be varied, but for the present embodiment, case 92 may contain a part of the storage batteries while casing 94 may contain the remainder of the batteries, a transformer, and a dry type rectifier so that the batteries may conveniently be recharged from house current when it becomes available. The voltages supplied by the batteries are 24 volts, for motor 42 and the solenoid 80 of the sequence valve 32, and 6 volts for the heaters of the thermionic tubes of the timer circuit and for the vibrator power supply to be described.

The circuit of the apparatus is shown schematically in Fig. 6, in which components already described bear the same reference numerals. The storage battery source is here designated by numeral 96, with its negative pole grounded. The ground symbol in the diagram refers to a common return conductor for the various circuits, and may or may not be connected to the cases themselves or to the electronic chassis. A three-circuit on-off switch 98, also shown in Fig. 4, controls the circuits from the 6 and 24 volt leads of the battery, and the circuit from the 115 volt commercial power supply cable 100. An overload circuit breaker 102 is indicated in series with the A. C. supply line; if a circuit breaker is desired for the battery supply, such may be conveniently mounted in one of the battery cases 92 or 94.

The 115 volt A. C. circuit is connected direct to the motor of the cooling fan 70, this fan being used only when the apparatus is energized from power lines. Also, the A. C. line is connected across the primary winding of a step-down transformer 104 whose secondary winding is tapped to provide voltages of 10, 24 and 32 volts, as shown. The zero voltage end of the secondary winding is connected to the ground or negative side of battery supply 96. The 10-volt tap of the transformer 104 provides excitation for the transformer of a vibrator-type power supply (to be described) which supplies anode voltage for the thermionic tubes of the timer apparatus, and for the driving coil of such vibrator through a suitable dropping resistor. It also provides, through a dropping resistor, for the application of 6 volts to the cathode heaters of such tubes. When the apparatus is operated from the batteries, with the 115 volt line disconnected, the necessary changes in connections are made automatically as will now be described in detail.

A pair of relays 106 and 108 have their operating windings connected permanently to the A. C. supply line 100, so that when the latter is disconnected, the relays are de-energized. This is the position of the relays and their contacts illustrated in Fig. 6, which therefore illustrates the circuitry for storage battery operation.

*Storage battery operation*

With the switch 98 turned to "on" position, the 24 volt circuit is extended to contacts $a$ of relay 106 and thence to the solenoid 80 which is in series with the normally open contacts of a relay 110 in the plate circuit of a timer tube, to be described. When relay 110 operates, the solenoid will be energized to shift the sequence valve 32 from its negative to its positive pressure delivering condition. A condenser 112 is connected across the contacts of relay 110, to reduce sparking and thereby prolong the life of those contacts. The 24 volt lead also passes, via contacts $b$ of relay 106, to lead 114 and thence to motor 42 and, by an obvious return circuit, to the negative pole of the battery.

The 6 volt battery lead passes via contacts $c$ of relay 106 to the heaters of the cathodes of the timer tubes, designated as the two halves of a twin triode tube 116, although separate tubes, and multi-electrode types, if desired, could be used. The 6 volt lead also is connected, via contacts $f$ of relay 108, to the center-tap of the primary winding of a vibrator transformer 118, and to the upper terminal of the driving coil or electromagnet 120 of such vibrator unit, the return path including contacts $h$ of the vibrator reed 122, lead 124, contacts $e$ of relay 108 and ground. The driving coil 120 is therefore energized and the reed 122 set into vibration which is maintained because the contact $h$ on the reed is self-interrupting. At opposite ends of its excursion, the reed 122 touches contacts $m$ and $n$ of the vibrator, alternately grounding these contacts over lead 124, and thereby causing the direct current to flow alternately in opposite directions in the two halves of the primary winding of transformer. The flux produced in the transformer core cuts the secondary winding of the transformer producing an alternating output voltage which is rectified by dry rectifiers 126 and applied through a smoothing filter 128 to the plate or anode supply conductor 130 to the timer components. The turns ratio of transformer 118 is such as to provide the usual D. C. plate supply of several hundred volts.

A pilot light 132 is connected as shown to give an indication when the respirator is operating on batteries, so that unnecessary battery operation may be guarded against. This pilot light is also indicated in Fig. 4 of the drawings. Contacts $d$ of relay 108 are open-circuited during battery operation, their function for A. C. operation being described below.

*Alternating current operation*

For operation from commercial A. C. circuits, the terminal plug of power cord 100 is plugged in, which immediately energizes relay 106. Contacts $a$, $b$, $c$, $d$, $e$, and $f$ of relay 106 move to positions opposite to that shown on Figure 6, thereby disconnecting the 6 and 24 volt leads of the battery at contacts $a$, $b$ and $c$. Then switch 98 is turned on, which energizes relay 108, the motor of fan 70 and the primary winding of transformer 104. The low potential end of the secondary winding of the transformer 104 is grounded, and its 24 volt lead is extended over a dry rectifier 134 and contacts *a* of relay 106 to the solenoid 80 as before, so that the latter is pulsed under the influence of the timer relay 110. A smoothing capacitor 136 is connected between the rectifier and ground, to smooth the current applied to the D. C. operating solenoid 80, in a well-known way.

The 24 volt power from the transformer tap also passes via a normally closed contact *p* of a manually operated momentary contact switch 138 and thence over contacts *b* of relay 106 to lead 114 and the universal (A. C./D. C.) motor 42 of the pressure source 20. Switch 138 is a so-called "speed-up" switch, which is employed to raise the voltage applied to pressure source 20 for short intervals, for clinical purposes. When the switch is operated to close contacts *q*, it applies 32 volts from the secondary of transformer 104 to the motor 42, and thereby raises the pressure produced. The switch is of the momentary type, so that upon release the motor is returned to 24-volt operation, to avoid unintentional prolonged overload of the motor. A spring 140 may be used to restore the switch when it is released.

The heaters of the cathodes of tube or tubes 116 are now supplied with 6 volts alternating current over contacts *c* of relay 106, the circuit leading over said contacts from the 10-volt tap of transformer 104. A voltage dropping resistor 142 serves to reduce the voltage to the desired 6 volts. A voltage of 10 volts is also applied, over lead 144, to contacts *d* of relay 108 and thence to one side of the primary winding of vibrator transformer 118, which is now employed as a simple step-up transformer. The other terminal of the primary winding is grounded through contacts *e* of relay 108. Contacts *f* of relay 108 now short out the pilot light 132 and the driver coil 120 and reed contacts of the vibrator.

The transformer 118 now steps up the applied 10 volts to a suitable value, and rectifiers 126 convert this to direct current of the desired potential for application to the plate supply lead 130 of the timer.

Electronic timer

The electronic timer portion of the apparatus serves to control two factors: (1) the respiration rate, by controlling the number of times per minute that the solenoid 80 is energized and de-energized, and (2) the proportionate parts of the duration of one complete breathing cycle occupied by the inspiration and expiration phases. The latter function is accomplished by controlling the absolute duration of the energized condition of the solenoid. Referring to Fig. 6, and as has been stated above, the timer of the present embodiment comprises a pair of triode tubes 116, in this case the two triode sections of a twin triode tube. The triodes are connected as a free-running multivibrator, which is essentially a resistance-capacitance coupled amplifier having a high degree of positive feedback. As shown, the cathodes of the triodes are connected together and to ground, and the grid electrode of each tube is connected to the anode or plate of the opposite tube through a capacitor 144, 146. The plate load resistor for the first triode is indicated at 148, and the plate load of the second section comprises the winding of relay 110, so that when the second triode (the right-hand one in Fig. 6) is conducting, its space current flows through relay 110 and operates the contact of the relay to energize the solenoid 80 as above described. A rectifier 150 is connected in shunt with the winding of relay 110 to prevent improper triggering of the multivibrator by reason of the voltage that would otherwise be applied to the grid of the first triode upon the collapse of the magnetic field of relay 110 when the second triode ceases to conduct. The rectifier may be a dry type of diode, the current resulting from the collapsing field potential being partially dissipated in the diode and partially in the series resistor 152.

The rate of cycling of the multivibrator is controlled by the potentiometer 154, whose control may be seen in Fig. 6 designated by the same numeral. Adjustment of this potentiometer controls the positive grid potential maximum, which is overcome by the negative potential derived from the capacitor connecting that grid to the opposite anode; since potentiometer 154 produces like variations in the rest grid potentials of both triodes, it does not affect the percentage of time during which each tube conducts. The potentiometer provides for an adjustment of respiration rates from about 10 to about 50 respirations per minute.

In order to control the percentage of the total cycle time during which the second (and therefore the first) triode conducts, the output lead 156 of potentiometer 154 is connected through two ganged potentiometers 158 and 160 to the respective grid electrodes of the triodes. These potentiometers are jointly controlled by the single control knob 162 seen also in Fig. 4 of the drawings. In the latter figure, the knob 162 is shown as recessed beneath the top of the casing or panel, and provided with a cover 164 to reduce the possibility of accidental change in its adjustment.

For a more detailed description of multivibrator circuits, reference may be made to standard texts, such as Terman's "Radio Engineering," 1932, McGraw-Hill Book Co., pages 273 et seq. Variations in the circuitry shown will be readily apparent to those skilled in electronics.

Solenoid-operated sequence valve

The composite sequence valve and positive and negative by-pass valves will now be described with reference to Fig. 7 of the drawings. This device may be made in separate parts, but for economy of manufacture it preferably comprises an integral body having a generally cylindrical center portion 164 and integral cylindrical side sections 166 and 168. Received within the cylindrical bore of section 166 is a rotatable sleeve valve 170 whose rotary position can be adjusted by the shaft 172 which extends up through the top of the casing of unit 16 and terminates in the adjusting knob 62 of Fig. 4. The section 166 communicates with the atmosphere (via the cone-shaped duct element 66, see also Fig. 3), and communicates with the cylindrical bore of center section 164 as by a port 174. The rotation of shaft 172, and hence of the sleeve 170, is limited to an angular adjustment which may be of the order of 90°. In similar fashion, the side section 168 has a cylindrical bore receiving the sleeve valve 176 rotatable through a limited arc (which may be defined by stop pins such as at 178) by a shaft 180 terminating above the casing top in knob 64. This by-pass valve also has a port 182 communicating with the atmosphere, and communicates with the cylindrical bore of the center cylinder by a port 184.

Valve section 166 has a port, indicated at 186, communicating with the positive pressure side of the pressure source 20 (via conduit 58 of Fig. 3), so that adjustment of valve sleeve 170 will determine the relative pressures conveyed to the center section via port 174 and to the atmosphere via duct section 66. A port 188 connects the interior of valve section 168 to the negative pressure side of the pressure source, and therefore adjusts the degree of suction conveyed to the center section via port 184. These by-pass valves therefore control the positive and negative pressures independently of one another.

The center section 164 of the valve contains a reciprocable valve stem or shaft 190 guided as by a bushing 192 at one end and at its other end connected as by pin 194 to the armature 196 of solenoid magnet 80 fixed at the upper end of the section 164. The stem 190 carries a pair of axially thin valve elements 198 and 200, so positioned that as the stem reciprocates between its motion limits, the ports 174 and 184 are alternately put in communication with the central section or space of the sequence valve, which is in constant communication with a port 202 in communication with the outlet fitting 78 (see Fig. 4) to which the duct 14 and pressure shell 12 are connected. When solenoid 80 is energized, the valve stem rises and opens port 174 to port 202, thus producing in the latter the degree of positive pressure established by the setting of the by-pass valve 170; likewise, when the valve stem descends as solenoid 80 is deenergized, port 174 is closed and port 184 put in communication with output port 202 to establish in the shell the negative pressure established by by-pass valve 176.

The force restoring the valve stem to its lower position when the solenoid is de-energized is provided by a spring 204 between a plate 206 secured to shaft 190 and the under side of the central section 164, or bushing 192. A second and shorter spring 208 is disposed within spring 204, and is compressed only when the stem is near the upper end of the stroke. This latter spring serves to increase the initial restoring force when solenoid 80 is first de-energized, and does this without increasing the spring force against which the solenoid must operate when the stem is fully down and the armature in its position most nearly outside the flux field of magnet 80. This design permits a smaller solenoid to be used, with consequently reduced power consumption and heat dissipation than would be the case if a single spring were employed. It also minimizes the possibility of the valve stem sticking in either of its extreme positions, and hence contributes to the reliability of the apparatus.

The upper limiting position of valve 200 is indicated in dashed lines in Fig. 7, and it will be understood that valve 198 would occupy a correspondingly raised position at the same time. The use of relatively thin valve elements 198 and 200 permits the transfer of the air flow by a short stroke and with considerable speed, and without introducing serious restrictions to the flow rate.

*Effect of respiration controls*

Fig. 8 illustrates graphically a representative range of "percentages of inspiration" (time) which can be obtained, the positive (expiration) and negative (inspiration) pressures being plotted as ordinates against the time duration of one complete cycle as abscissas. The full line curve indicates the condition for a minimum or 25% inspiration phase (75% expiration), and the dashed line curve indicates the condition for a maximum of 75% inspiration phase (25% expiration). It is to be understood that, since the blower output is continuous, it produces a pressure increase and decrease in the patient shell 12 at some given rate depending upon shell volume, efficiency of the shell seal, setting of the by-pass valves, and friction in the various ducts and passages. Actually, instead of the square curves of Fig. 8, the changes in pressure will be more gradual, probably corresponding to triangular-shaped graphs as in the following graphs.

Fig. 9 of the drawings is a graph of the pressure functions utilizing negative pressures only, the positive by-pass control being opened fully to the atmosphere and the port 174 of Fig. 7 closed. The full line graph illustrates the variation for a 25% inspiration phase, the remainder of the cycle showing the return of shell pressure to zero (relative to atmosphere) under the influence of the normal return of the patient's chest during exhalation. No positive pressure is supplied. The dashed line curve illustrates the same variation with the control 162 set for a 50% inspiration phase.

Fig. 10 is a set of graphs corresponding to those of Fig. 9 but with the positive by-pass valve set for closing the port to atmosphere more or less to provide a positive pressure to the shell during a part of the cycle. Again, the setting for 25 (and 50) percent inspiration time is shown in full and dashed lines.

In Fig. 11, the effect of the flow control throttle 26 (of Fig. 2) is illustrated. Figure 11 shows this effect for a 75% inspiration phase, with no positive pressure component in the cycle. The negative pressure rises to its maximum (throttle open) value in 25% in the cycle time, and is held there for the next 50% of the cycle time, followed by expiration (normal chest return) occupying the final 25% of the cycle.

The function of the flow control valve 26 is not exactly one of setting an upper limit for both positive and negative pressures. It is quite true that there is an effect in this direction because if the orifice size in the air flow conduit 24 is decreased, the maximum pressure which a centrifugal type blower can achieve is somewhat decreased. If, on the other hand, pressure control 30 is partially open to atmosphere with flow control 26 entirely open (that is, the patient demand is less than blower output) then it would be possible to achieve almost the same pressure to the patient by partially closing flow control 26 and further closing of pressure control 30 to atmosphere. It will, however, take a longer time to achieve this pressure, as shown in Figure 12. With flow control 26 wide open the blower can, particularly where the patient demand volume is low and the percentage of inspiration is high, achieve its maximum pressure in a fraction of the total time allowed for inspiration by the timer. In that case, the remaining inspiration time is just a holding of negative pressure, as shown in the dotted line of Figure 12. Now if the throttle is partially closed, the slope of the inspiration pressure versus time is decreased and the hold portion reduced, as shown by the solid line in Figure 12.

A variety of other functional variations in the pressure cycle can be obtained by manipulation of the controls as described, permitting the physician almost unlimited control of the respiration cycle desired for a particular patient.

While the invention has been described in connection with a preferred embodiment given by way of example and in compliance with the patent statutes, it is to be understood that many modifications can be made by those skilled in the art without departing from the spirit of the invention as defined in the appended claims.

What is claimed is:

1. Respirator apparatus for the mechanical control of a patient's breathing, having a body-contacting shell for confining mechanically induced sequential positive and negative pressures to be effective on the patient's body; means for producing such sequence of pressures comprising a source of positive and negative pressures; and sequence valve means having a positive pressure-receiving zone with an opening to the atmosphere as well as a negative pressure-receiving zone with an opening to the atmosphere and an intermediate zone into which the positive and the negative pressures are alternately delivered, a shell-connecting conduit leading from that intermediate zone, a positive pressure conduit leading from the positive pressure producer to the positive zone of the sequence valve, a negative pressure conduit leading from the negative pressure producer to the negative zone of the sequence valve, a reciprocable valve-stem carrying two valve-discs of which one is associated with the positive zone and one is associated with the negative zone whose reciprocation in one direction carries the positive zone disc to pass positive expiration pressure from its conduit to the intermediate zone and thus to the patient's shell while the negative disc bleeds negative pressure from its conduit to the atmosphere, and whose reciprocation in the other direction carries the negative zone disc to pass negative inspiration pressure from its conduit to the intermediate zone and thus to the patient's shell while the positive disc bleeds positive pressure to the atmosphere.

2. Apparatus according to claim 1, wherein the pressure producing means produces pressures both positive and negative that are substantially constant; wherein in the positive pressure conduit there is a control valve for bleeding positive pressure to the atmosphere; and wherein in the negative pressure conduit there is a control valve for bleeding negative pressure to the atomsphere.

3. Apparatus according to claim 2, with the addition of flow-control throttle means in the negative pressure conduit between the pressure producer and the control valve of that conduit.

4. Apparatus according to claim 1, including solenoid means for moving the reciprocable valve-stem at least in one direction.

5. Apparatus according to claim 1, including solenoid means for moving the reciprocable valve-stem in one direction, and spring means for moving the reciprocable valve-stem in the other direction.

6. Apparatus according to claim 1, including electronic timing means connected to control the reciprocation of the valve-stem.

7. Apparatus according to claim 6, wherein the valve-timing means includes two controls of which one controls the rate of reciprocation of the valve-stem and thus the number per minute of cycles each of one applied positive pressure and one applied negative pressure while the other controls the relative duration of the positive pressure phase to the negative pressure phase of each cycle and thus the ratio between the inspiration phase and the expiration phase.

8. In artificial respiration apparatus of the type including a patient shell provided with a chamber shaped for communication with the thorax to convey pressure variations thereto and a source of both high and low pressure fluid communicating with said shell to produce pressure variations in such chamber, the improvement which comprises conduits connecting with both the high and low pressure outlets of said source, individually adjustable functionally independent pressure controls for setting the maximum high and minimum low pressure applied to said conduits, respectively, and cyclically operable control means for sequentially connecting said conduits with said shell including a valve having a reciprocable stem for directing pressure fluid sequentially from said respective pressure controls to said shell, and a solenoid magnet for operating said valve stem.

9. Artificial respiration apparatus in accordance with claim 8, a timing circuit for energizing said magnet periodically, and means included in said circuit for adjusting the frequency of energization of said magnet.

10. Artificial respiration apparatus in accordance with claim 8, a timing circuit for energizing said magnet periodically, and means included in said circuit for adjusting the portion of each operating cycle, during which said magnet is energized.

References Cited in the file of this patent

UNITED STATES PATENTS

| | | |
|---|---|---|
| Re. 20,226 | Drinker | Jan. 5, 1937 |
| 404,324 | Van Bepoele | May 28, 1889 |
| 2,223,570 | McMillin | Dec. 3, 1940 |
| 2,288,436 | Cahan | June 30, 1942 |
| 2,309,470 | McCollam | Jan. 26, 1943 |
| 2,456,724 | Mullikin | Dec. 21, 1948 |
| 2,600,240 | Grieb | June 10, 1952 |